United States Patent
Segal et al.

(10) Patent No.: US 10,068,095 B1
(45) Date of Patent: *Sep. 4, 2018

(54) SYSTEMS AND METHODS FOR SELECTING A TERMINATION RULE FOR A PENETRATION TESTING CAMPAIGN

(71) Applicant: XM Ltd., Hertzelia (IL)

(72) Inventors: Ronen Segal, Hertzelia (IL); Menahem Lasser, Kohav-Yair (IL)

(73) Assignee: XM Cyber Ltd, Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,975

(22) Filed: Dec. 11, 2017

Related U.S. Application Data

(60) Provisional application No. 62/506,161, filed on May 15, 2017.

(51) Int. Cl.
  *G06F 21/57* (2013.01)
  *H04L 29/06* (2006.01)

(52) U.S. Cl.
  CPC ........ *G06F 21/577* (2013.01); *H04L 63/1433* (2013.01); *H04L 63/20* (2013.01); *G06F 2221/034* (2013.01)

(58) Field of Classification Search
  CPC ............. G06F 21/577; G06F 2221/034; H04L 63/1433; H04L 63/20
  See application file for complete search history.

(56) References Cited

U.S. PATENT DOCUMENTS

| | | |
|---|---|---|
| 6,952,779 B1 | 10/2005 | Cohen et al. |
| 7,013,395 B1 | 3/2006 | Swiler et al. |
| 7,757,293 B2 | 7/2010 | Caceres et al. |
| 8,001,589 B2 | 8/2011 | Cormazabal et al. |
| 8,112,016 B2 | 2/2012 | Matsumoto et al. |
| 8,127,359 B2 | 2/2012 | Kelekar |
| 8,356,353 B2 | 1/2013 | Futoransky et al. |
| 8,365,289 B2 | 1/2013 | Russ et al. |
| 8,490,193 B2 | 7/2013 | Sarraute Yamada et al. |
| 8,650,651 B2 | 2/2014 | Podjamy et al. |
| 8,813,235 B2 | 8/2014 | Sidagni |
| 9,076,013 B1 | 7/2015 | Bailey, Jr. et al. |
| 9,183,397 B2 | 11/2015 | Futoransky et al. |
| 9,224,117 B2 | 12/2015 | Chapman |

(Continued)

FOREIGN PATENT DOCUMENTS

| | | |
|---|---|---|
| CN | 103200230 A | 7/2013 |
| CN | 104009881 A | 8/2014 |

(Continued)

OTHER PUBLICATIONS

CN103200230 Machine Translation (by EPO and Google) published Jul. 10, 2013 Li Qianmu.

(Continued)

*Primary Examiner* — Amir Mehrmanesh

(74) *Attorney, Agent, or Firm* — Marc Van Dyke; Fourth Dimension IP

(57) ABSTRACT

Systems and methods of penetration testing of a networked system by a penetration testing system that is controlled by a user interface of a computing device so that a penetration testing campaign is executed until a termination condition is satisfied, the termination condition being manually and explicitly selected and being an indirect termination condition.

30 Claims, 11 Drawing Sheets

(56) References Cited

U.S. PATENT DOCUMENTS

| | | | |
|---|---|---|---|
| 9,270,696 | B2 | 2/2016 | Fritzson et al. |
| 9,276,952 | B2 | 3/2016 | Simpson et al. |
| 9,292,695 | B1 | 3/2016 | Bassett |
| 9,350,753 | B2 | 5/2016 | Kaplan et al. |
| 9,473,522 | B1 | 10/2016 | Kotler et al. |
| 9,558,355 | B2 * | 1/2017 | Madou ............... H04L 63/1433 |
| 2005/0086502 | A1 * | 4/2005 | Rayes .................... H04L 63/20 |
| | | | 713/189 |
| 2007/0204347 | A1 | 8/2007 | Caceres et al. |
| 2008/0209567 | A1 | 8/2008 | Lockhart et al. |
| 2008/0288822 | A1 | 11/2008 | Wu et al. |
| 2009/0172813 | A1 | 7/2009 | Aaron |
| 2010/0138925 | A1 | 6/2010 | Barai et al. |
| 2011/0035803 | A1 | 2/2011 | Lucangeli Obes et al. |
| 2012/0174228 | A1 | 7/2012 | Giakouminakis et al. |
| 2013/0031635 | A1 | 1/2013 | Lotem et al. |
| 2014/0173739 | A1 | 6/2014 | Ahuja et al. |
| 2014/0237606 | A1 | 8/2014 | Futoransky et al. |
| 2016/0044057 | A1 | 2/2016 | Chenette et al. |
| 2016/0248800 | A1 | 8/2016 | Ng et al. |
| 2016/0275289 | A1 | 9/2016 | Sethumadhavan et al. |
| 2016/0342796 | A1 * | 11/2016 | Kaplan ............... H04L 63/1433 |
| 2016/0352771 | A1 | 12/2016 | Sivan et al. |
| 2017/0098086 | A1 | 4/2017 | Hoernecke et al. |
| 2017/0116421 | A1 * | 4/2017 | M C ..................... G06F 21/577 |

FOREIGN PATENT DOCUMENTS

| | | |
|---|---|---|
| CN | 103916384 A | 4/2017 |
| EP | 1559008 A1 | 4/2017 |
| WO | WO0038036 A2 | 4/2017 |
| WO | WO2010069587 A1 | 4/2017 |
| WO | WO2013087982 A1 | 4/2017 |
| WO | WO2015111039 A1 | 4/2017 |
| WO | WO2016164844 A1 | 4/2017 |

OTHER PUBLICATIONS

CN103916384 Machine Translation (by EPO and Google) published on Apr. 6, 2017 Zhong et al.

CN104009881 Machine Translation (by EPO and Google) published on Aug. 27, 2014 Wang et al.

\* cited by examiner

Frame 1 at time = *t1*

600    Proposed termination conditions

* Exporting the file "salaries.xls"
* Exporting at least one file from node "CEO"
* Compromising more than 50% of the nodes
* Changing permissions of ten files Frame 2 at time = *t2*

600    Proposed termination conditions

* Exporting the file "salaries.xls"
* Exporting at least one file from node "CEO"
* Compromising more than 50% of the nodes
* Changing permissions of ten files Frame 3 at time = *t3*

 ● BEGIN    606

Figure 6

Frame 1 at time = *t1*

700 Proposed termination conditions

* Exporting the file "salaries.xls"
* Exporting at least one file from node "CEO"
* Compromising more than 50% of the nodes
* Changing permissions of ten files Frame 2 at time = *t2*

OVERRIDE   706

Frame 3 at time = *t3*

710   Class of termination condition

------------ Select ---------------- ▼

712

714   Termination condition

------------ Select ---------------- ▼

SYSTEMS AND METHODS FOR SELECTING A TERMINATION RULE FOR A PENETRATION TESTING CAMPAIGN

RELATED APPLICATION

The present application gains priority from U.S. Provisional Patent Application 62/506,161 filed on May 15, 2017 and entitled "Criteria for Terminating a Penetration Test", which is incorporated herein by reference as if fully set forth herein.

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above difficulties, several vendors are proposing automated penetration testing systems. These automated solutions reduce human involvement in the penetration testing process, or at least in some of its functions. Some such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30 and optionally cleanup function code 50—for example, in combination with suitable hardware (e.g. one or more computing device(s) 110 and one or more processor(s) 120 thereof, see FIG. 2) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device 140), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems may employ different types of architectures, each having its advantages and disadvantages. Examples are actual attack penetration testing systems, simulated penetration testing systems and reconnaissance agent penetration testing systems. See the Definitions section for more details about these types of penetration testing systems.

The Problem to Solve

When a user desires to perform a penetration test to evaluate the vulnerabilities of a tested networked system using a prior art penetration testing system, the penetration testing system must know when it should halt, or terminate, the test. As some networked systems contain thousands of network nodes, a penetration test may take a very long time. Additionally, sometimes compromising of a specific node might depend on an occurrence of some specific circumstances (for example performing by the specific node of some specific action, such as sending out a WPAD network message in order to find out a configuration file that determines a proxy server for a target URL) that do not occur frequently, and this might further extend the duration of a penetration test. Therefore, it is not always desirable to let a penetration test run to its ultimate end, which is (i) compromising all the network nodes of the tested networked system, or (ii) giving up before compromising all the network nodes after concluding that no further progress is possible because no additional network node can be compromised.

Prior art penetration testing systems may give the user an option for halting the test according to a target-nodes-based halting condition. For example, the user may define a single specific target node in the tested networked system and then specify that the test should halt after that target node is compromised. Alternatively, the user may define multiple specific target nodes in the tested networked system and then specify that the test should halt after all the target nodes are compromised, or after any one of the target nodes is compromised.

Additionally, prior art penetration testing systems may give the user an option for halting the test according to a target-application-based halting condition. For example, the user may define a target application (e.g. a certain financial application used by the organization owning the tested networked system) and then specify that the test should halt after the target application is compromised in any node of the networked system.

Furthermore, prior art penetration testing systems may give the user an option for halting the test according to a time-based halting condition. For example, the user may specify that the test should halt after executing for a predetermined duration, such as six hours, or that the test should halt at a specific time, for example at 3 am.

Additionally, prior art penetration testing systems may apply an implied halting condition derived from the goal of the attacker of the penetration testing campaign. For example, if the goal of the attacker is to "compromise at least five network nodes" and the penetration testing system is configured to halt when reaching the goal, then the penetration testing system acts as if there is a halting condition of "at least five network nodes are already compromised" in effect.

All the above halting conditions may collectively be called "direct halting conditions", as they all provide a direct and simply-defined condition for halting the penetration test. In the present application, all other types of halting conditions are termed "indirect halting conditions", as defined in the Definitions section hereinbelow.

The flexibility provided by the direct halting conditions discussed above is limited. For example, a user running a penetration test may desire to halt the test once a specific defensive application is detected to exist in the tested networked system. As another example, the user may desire to stop the test once a certain number of files of a certain type (for example Excel files) are successfully exported (or it is determined that it would be possible for a potential attacker to export them) outside the networked system. The direct halting conditions proposed by prior art penetration testing systems are not good enough for supporting such user needs.

There is therefore a need in the art for an automatic penetration testing system and a method allowing a user to define or select any desired termination condition or halting condition.

SUMMARY OF THE INVENTION

Some embodiments of the invention relate to methods and systems for carrying out automated penetration testing, in which a user manually and explicitly defines a termination condition of a testing campaign.

According to a first aspect of an embodiment of the invention, there is provided a method of penetration testing of a networked system by a penetration testing system that is controlled by a user interface of a computing device so that a penetration testing campaign is executed until a termination condition is satisfied, the termination condition being manually and explicitly selected, the method including:
  a. receiving, by the penetration testing system and via the user interface of the computing device, one or more manually-entered inputs, the one or more manually-entered inputs explicitly selecting the termination condition for the penetration testing campaign, the termination condition being selected from the group consisting of:
    i. a termination condition associated with exporting one or more files out of the networked system;
    ii. a termination condition associated with damaging one or more files;
    iii. a termination condition associated with encrypting one or more files;
    iv. a termination condition associated with a number of compromised network nodes;
    v. a termination condition associated with a specific condition that is either true or false for each network node of the networked system;
    vi. a termination condition associated with a specific defensive software application; and
    vii. a termination condition associated with changing access rights of one or more files;
  b. executing the penetration testing campaign, by the penetration testing system, so as to test the networked system;
  c. checking, by the penetration testing system and while the penetration testing campaign is executing, whether the explicitly and manually-selected termination condition is satisfied;
  d. only if the explicitly and manually-selected termination condition is satisfied, terminating execution of the penetration testing campaign;
  e. reporting, by the penetration testing system, at least one security vulnerability determined to exist in the networked system by the executing of the penetration testing campaign, wherein the reporting includes at least one of (i) causing a display device to display a report describing the at least one security vulnerability, (ii) storing the report describing the at least one security vulnerability in a file and (iii) electronically transmitting the report describing the at least one security vulnerability.

According to a second aspect of an embodiment of the invention, there is provided a method of penetration testing of a networked system by a penetration testing system that is controlled by a user interface of a computing device so that a penetration testing campaign is executed until a termination condition is satisfied, the termination condition being manually and explicitly selected, the method including:
  a. receiving, by the penetration testing system and via the user interface of the computing device, one or more manually-entered inputs, the one or more manually-entered inputs explicitly selecting the termination condition for the penetration testing campaign, the termination condition being an indirect termination condition;
  b. executing the penetration testing campaign, by the penetration testing system, so as to test the networked system;
  c. checking, by the penetration testing system and while the penetration testing campaign is executing, whether the explicitly and manually-selected termination condition is satisfied;
  d. only if the explicitly and manually-selected termination condition is satisfied, terminating execution of the penetration testing campaign;
  e. reporting, by the penetration testing system, at least one security vulnerability determined to exist in the networked system by the executing of the penetration testing campaign, wherein the reporting includes at least one of (i) causing a display device to display a report describing the at least one security vulnerability, (ii) storing the report describing the at least one security vulnerability in a file and (iii) electronically transmitting the report describing the at least one security vulnerability. [file]

In some embodiments of the first and second aspects, the termination condition is associated with exporting one or more files out of the networked system.

In some such embodiments, the termination condition is satisfied when the penetration testing system exports or determines that it could export a file having a specific file name out of the networked system.

In some such embodiments, the termination condition is satisfied when the penetration testing system exports or determines that it could export a file, from a specific network node of the networked system, out of the networked system.

In some such embodiments, the termination condition is satisfied when the penetration testing system exports or determines that it could export a specific number of files, from a specific network node of the networked system, out of the networked system.

In some such embodiments, the termination condition is satisfied when the penetration testing system exports or determines that it could export a specific number of files out of the networked system.

In some such embodiments, the termination condition is satisfied when the penetration testing system exports or determines that it could export one or more files, whose total size is more than a specific size, out of the networked system.

In some such embodiments, the termination condition is satisfied when the penetration testing system exports or determines that it could export one or more files of a specific type out of the networked system.

In some such embodiments, the termination condition is satisfied when the penetration testing system exports or determines that it could export one or more files of a specific type, whose total size is more than a specific size, out of the networked system.

In some embodiments of the first or second aspects, the termination condition is associated with damaging one or more files.

In some such embodiments, the termination condition is satisfied when the penetration testing system damages or determines that it could damage in a specific way a specific number of files of the networked system.

In some such embodiments, the termination condition is satisfied when the penetration testing system damages or determines that it could damage in a specific way a file having a specific file name of the networked system.

In some such embodiments, the termination condition is satisfied when the penetration testing system damages or determines that it could damage in a specific way a file having a specific file name in a specific network node of the networked system.

In some such embodiments, the termination condition is satisfied when the penetration testing system damages or determines that it could damage in a specific way a specific number of files having a specific type.

In some such embodiments, the termination condition is satisfied when the penetration testing system damages or determines that it could damage in a specific way at least one file in a specific network node of the networked system.

In some embodiments, of the first or second aspects, the termination condition is associated with encrypting one or more files.

In some such embodiments, the termination condition is satisfied when the penetration testing system encrypts or determines that it could encrypt a specific number of files of the networked system.

In some such embodiments, the termination condition is satisfied when the penetration testing system encrypts or determines that it could encrypt a file having a specific file name of the networked system.

In some such embodiments, the termination condition is satisfied when the penetration testing system encrypts or determines that it could encrypt a file having a specific file name in a specific network node of the networked system.

In some such embodiments, the termination condition is satisfied when the penetration testing system encrypts or determines that it could encrypt a specific number of files having a specific type.

In some such embodiments, the termination condition is satisfied when the penetration testing system encrypts or determines that it could encrypt at least one file in a specific network node of the networked system.

In some embodiments of the first or second aspects, the termination condition is associated with a number of compromised network nodes.

In some such embodiments, the termination condition is satisfied when the penetration testing system compromises or determines that it could compromise a specific number larger than one of network nodes, regardless of a specific identity of those compromised network nodes.

In some such embodiments, the termination condition is satisfied when the penetration testing system compromises or determines that it could compromise a number of network nodes such that a ratio of the number of compromised network nodes in the networked system to the number of uncompromised network nodes in the networked system is higher than a specific threshold.

In some such embodiments, the termination condition is satisfied when the penetration testing system compromises or determines that it could compromise a number of network nodes such that a difference between the number of compromised network nodes in the networked system and the number of uncompromised network nodes in the networked system is higher than a specific threshold.

In some such embodiments, the termination condition is satisfied when the penetration testing system compromises or determines that it could compromise a number of network nodes such that a percentage of compromised network nodes in the networked system is higher than a specific threshold.

In some embodiments of the first or second aspects, the termination condition is associated with a specific condition that is either true or false for each network node of the networked system.

In some such embodiments, the termination condition is satisfied when the penetration testing system compromises or determines that it could compromise a specific number of network nodes which satisfy the specific condition.

In some such embodiments, the termination condition is satisfied when the penetration testing system compromises or determines that it could compromise all network nodes of the networked system that satisfy the specific condition.

In some embodiments of the first or second aspects, the termination condition is satisfied when the penetration testing system detects an existence in the networked system of a specific defensive software application.

In some embodiments of the first or second aspects, the termination condition is associated with changing access rights of one or more files.

In some such embodiments, the termination condition is satisfied when the penetration testing system changes access rights or determines that it could change access rights of a specific number of files of the networked system.

In some such embodiments, the termination condition is satisfied when the penetration testing system changes access rights or determines that it could change access rights of a file having a specific file name of the networked system.

In some such embodiments, the termination condition is satisfied when the penetration testing system changes access rights or determines that it could change access rights of a file having a specific file name in a specific network node of the networked system.

In some such embodiments, the termination condition is satisfied when the penetration testing system changes access rights or determines that it could change access rights of a specific number of files having a specific type.

In some such embodiments, the termination condition is satisfied when the penetration testing system changes access rights or determines that it could change access rights of at least one file in a specific network node of the networked system.

In some embodiments of the first or second aspects, before the receiving the one or more manually-entered inputs that explicitly select the termination condition for the penetration testing campaign, the penetration testing system automatically computes and displays an explicit recommendation for selecting the termination condition.

In some such embodiments, the received one or more manually-entered inputs includes an explicit user approval of the explicit recommendation.

In some embodiments of the first or second aspects, before the receiving the one or more manually-entered inputs that explicitly select the termination condition for the penetration testing campaign, the penetration testing system automatically computes and displays a list of possible termination conditions.

In some such embodiments, the received one or more manually-entered inputs includes an explicit user selection of one of the possible termination conditions in the list as the termination condition for the penetration testing campaign.

According to a first aspect of an embodiment of the invention, there is provided a system of penetration testing of a networked system, the system including:
- a. a termination-condition-selecting user interface including one or more user interface components for manual and explicit selection of a termination condition for a penetration testing campaign, where the termination-condition-selecting user interface resides in a computing device, the termination condition being selected from the group consisting of:
  i. a termination condition associated with exporting one or more files out of the networked system;
  ii. a termination condition associated with damaging one or more files;
  iii. a termination condition associated with encrypting one or more files;
  iv. a termination condition associated with a number of compromised network nodes;
  v. a termination condition associated with a specific condition that is either true or false for each network node of the networked system;
  vi. a termination condition associated with a specific defensive software application; and
  vii. a termination condition associated with changing access rights of one or more files;
- b. a penetration-testing-campaign module including:
  i. one or more penetration-testing-campaign processors; and
  ii. a penetration-testing-campaign non-transitory computer readable storage medium for instructions execution by the one or more penetration-testing-campaign processors, the penetration-testing-campaign non-transitory computer readable storage medium having stored instructions to perform the penetration testing campaign so as to test the networked system, and to terminate the penetration testing campaign when the manually and explicitly-selected termination condition is satisfied; and
- c. a reporting module including:
  i. one or more reporting processors; and
  ii. a reporting non-transitory computer readable storage medium for instructions execution by the one or more reporting processors, the reporting non-transitory computer readable storage medium having stored instructions to report at least one security vulnerability determined to exist in the networked system according to results of the penetration testing campaign performed by the penetration-testing-campaign module, wherein the reporting module is configured to report the at least one security vulnerability by performing at least one of (i) causing a display device to display a report describing the at least one security vulnerability, (ii) storing the report describing the at least one security vulnerability in a file and (iii) electronically transmitting the report describing the at least one security vulnerability.

According to a second aspect of an embodiment of the invention, there is provided a system of penetration testing of a networked system, the system including:
- a. a termination-condition-selecting user interface including one or more user interface components for manual and explicit selection of a termination condition for a penetration testing campaign, where the termination-condition-selecting user interface resides in a computing device, the termination condition being an indirect termination condition;
- b. a penetration-testing-campaign module including:
  i. one or more penetration-testing-campaign processors; and
  ii. a penetration-testing-campaign non-transitory computer readable storage medium for instructions execution by the one or more penetration-testing-campaign processors, the penetration-testing-campaign non-transitory computer readable storage medium having stored instructions to perform the penetration testing campaign so as to test the networked system, and to terminate the penetration testing campaign when the manually and explicitly-selected termination condition is satisfied; and
- c. a reporting module including:
  i. one or more reporting processors; and
  ii. a reporting non-transitory computer readable storage medium for instructions execution by the one or more reporting processors, the reporting non-transitory computer readable storage medium having stored instructions to report at least one security vulnerability determined to exist in the networked system according to results of the penetration testing campaign performed by the penetration-testing-campaign module, wherein the reporting module is configured to report the at least one security vulnerability by performing at least one of (i) causing a display device to display a report describing the at least one security vulnerability, (ii) storing the report describing the at least one security vulnerability in a file and (iii) electronically transmitting the report describing the at least one security vulnerability.

In some embodiments of the first or second aspects, the termination condition is associated with exporting one or more files out of the networked system.

In some such embodiments, the termination condition is satisfied when the penetration-testing-campaign module exports or determines that it could export a file having a specific file name out of the networked system.

In some such embodiments, the termination condition is satisfied when the penetration-testing-campaign module exports or determines that it could export a file, from a specific network node of the networked system, out of the networked system.

In some such embodiments, the termination condition is satisfied when the penetration-testing-campaign module exports or determines that it could export a specific number of files, from a specific network node of the networked system, out of the networked system.

In some such embodiments, the termination condition is satisfied when the penetration-testing-campaign module exports or determines that it could export a specific number of files out of the networked system.

In some such embodiments, the termination condition is satisfied when the penetration-testing-campaign module exports or determines that it could export one or more files, whose total size is more than a specific size, out of the networked system.

In some such embodiments, the termination condition is satisfied when the penetration-testing-campaign module exports or determines that it could export one or more files of a specific type out of the networked system.

In some such embodiments, the termination condition is satisfied when the penetration-testing-campaign module exports or determines that it could export one or more files of a specific type, whose total size is more than a specific size, out of the networked system.

In some embodiments of the first or second aspects, the termination condition is associated with damaging one or more files.

In some such embodiments, the termination condition is satisfied when the penetration-testing-campaign module damages or determines that it could damage in a specific way a specific number of files of the networked system.

In some such embodiments, the termination condition is satisfied when the penetration-testing-campaign module damages or determines that it could damage in a specific way a file having a specific file name of the networked system.

In some such embodiments, the termination condition is satisfied when the penetration-testing-campaign module damages or determines that it could damage in a specific way a file having a specific file name in a specific network node of the networked system.

In some such embodiments, the termination condition is satisfied when the penetration-testing-campaign module damages or determines that it could damage in a specific way a specific number of files having a specific type.

In some such embodiments, the termination condition is satisfied when the penetration-testing-campaign module damages or determines that it could damage in a specific way at least one file in a specific network node of the networked system.

In some embodiments of the first or second aspects, the termination condition is associated with encrypting one or more files.

In some such embodiments, the termination condition is satisfied when the penetration-testing-campaign module encrypts or determines that it could encrypt a specific number of files of the networked system.

In some such embodiments, the termination condition is satisfied when the penetration-testing-campaign module encrypts or determines that it could encrypt a file having a specific file name of the networked system.

In some such embodiments, the termination condition is satisfied when the penetration-testing-campaign module encrypts or determines that it could encrypt a file having a specific file name in a specific network node of the networked system.

In some such embodiments, the termination condition is satisfied when the penetration-testing-campaign module encrypts or determines that it could encrypt a specific number of files having a specific type.

In some such embodiments, the termination condition is satisfied when the penetration-testing-campaign module encrypts or determines that it could encrypt at least one file in a specific network node of the networked system.

In some embodiments of the first and second aspects, the termination condition is associated with a number of compromised network nodes.

In some such embodiments, the termination condition is satisfied when the penetration-testing-campaign module compromises or determines that it could compromise a specific number larger than one of network nodes, regardless of a specific identity of those compromised network nodes.

In some such embodiments, the termination condition is satisfied when the penetration-testing-campaign module compromises or determines that it could compromise a number of network nodes such that a ratio of the number of compromised network nodes in the networked system to the number of uncompromised network nodes in the networked system is higher than a specific threshold.

In some such embodiments, the termination condition is satisfied when the penetration-testing-campaign module compromises or determines that it could compromise a number of network nodes such that a difference between the number of compromised network nodes in the networked system and the number of uncompromised network nodes in the networked system is higher than a specific threshold.

In some such embodiments, the termination condition is satisfied when the penetration-testing-campaign module compromises or determines that it could compromise a number of network nodes such that a percentage of compromised network nodes in the networked system is higher than a specific threshold.

In some embodiments of the first and second aspects, the termination condition is associated with a specific condition that is either true or false for each network node of the networked system.

In some such embodiments, the termination condition is satisfied when the penetration-testing-campaign module compromises or determines that it could compromise a specific number of network nodes which satisfy the specific condition.

In some such embodiments, the termination condition is satisfied when the penetration-testing-campaign module compromises or determines that it could compromise all network nodes of the networked system that satisfy the specific condition.

In some embodiments of the first and second aspects, the termination condition is satisfied when the penetration testing system detects an existence in the networked system of a specific defensive software application.

In some embodiments of the first and second aspects, the termination condition is associated with changing access rights of one or more files.

In some such embodiments, the termination condition is satisfied when the penetration-testing-campaign module changes access rights or determines that it could change access rights of a specific number of files of the networked system.

In some such embodiments, the termination condition is satisfied when the penetration-testing-campaign module changes access rights or determines that it could change access rights of a file having a specific file name of the networked system.

In some such embodiments, the termination condition is satisfied when the penetration-testing-campaign module changes access rights or determines that it could change access rights of a file having a specific file name in a specific network node of the networked system.

In some such embodiments, the termination condition is satisfied when the penetration-testing-campaign module changes access rights or determines that it could change access rights of a specific number of files having a specific type.

In some such embodiments, the termination condition is satisfied when the penetration-testing-campaign module changes access rights or determines that it could change access rights of at least one file in a specific network node of the networked system.

In some embodiments of the first and second aspects, the system further includes a recommendation module including:

a. one or more recommendation processors; and
b. a recommendation non-transitory computer readable storage medium for instructions execution by the one or more recommendation processors, the recommendation non-transitory computer readable storage medium having stored instructions to automatically compute an explicit recommendation for selecting the termination condition for the penetration testing campaign, wherein the termination-condition-selection user interface displays the explicit recommendation.

In some such embodiments, the one or more user interface components include a user interface component for explicit user approval of the explicit recommendation.

In some embodiments of the first and second aspects, the system further includes a recommendation module including:

a. one or more recommendation processors; and
b. a recommendation non-transitory computer readable storage medium for instructions execution by the one or more recommendation processors, the recommendation non-transitory computer readable storage medium having stored instructions to automatically compute a list of possible termination conditions for the penetration testing campaign, wherein the termination-condition-selection user interface displays the list of possible termination conditions.

In some such embodiments, the one or more user interface components include a user interface component for explicit user selection of one of the possible termination conditions in the list to be the termination condition for the penetration testing campaign.

In some embodiments of the first and second aspects, the penetration-testing-campaign non-transitory computer readable storage medium and the reporting non-transitory computer readable storage medium are the same storage medium. In some embodiments of the first and second aspects, the one or more penetration-testing-campaign processors and the one or more reporting processors share at least one common processor.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 6 illustrates a third example of user engagements of a user interface according to a third embodiment of the invention.

DESCRIPTION OF SOME EMBODIMENTS OF THE INVENTION

Figure 1A:
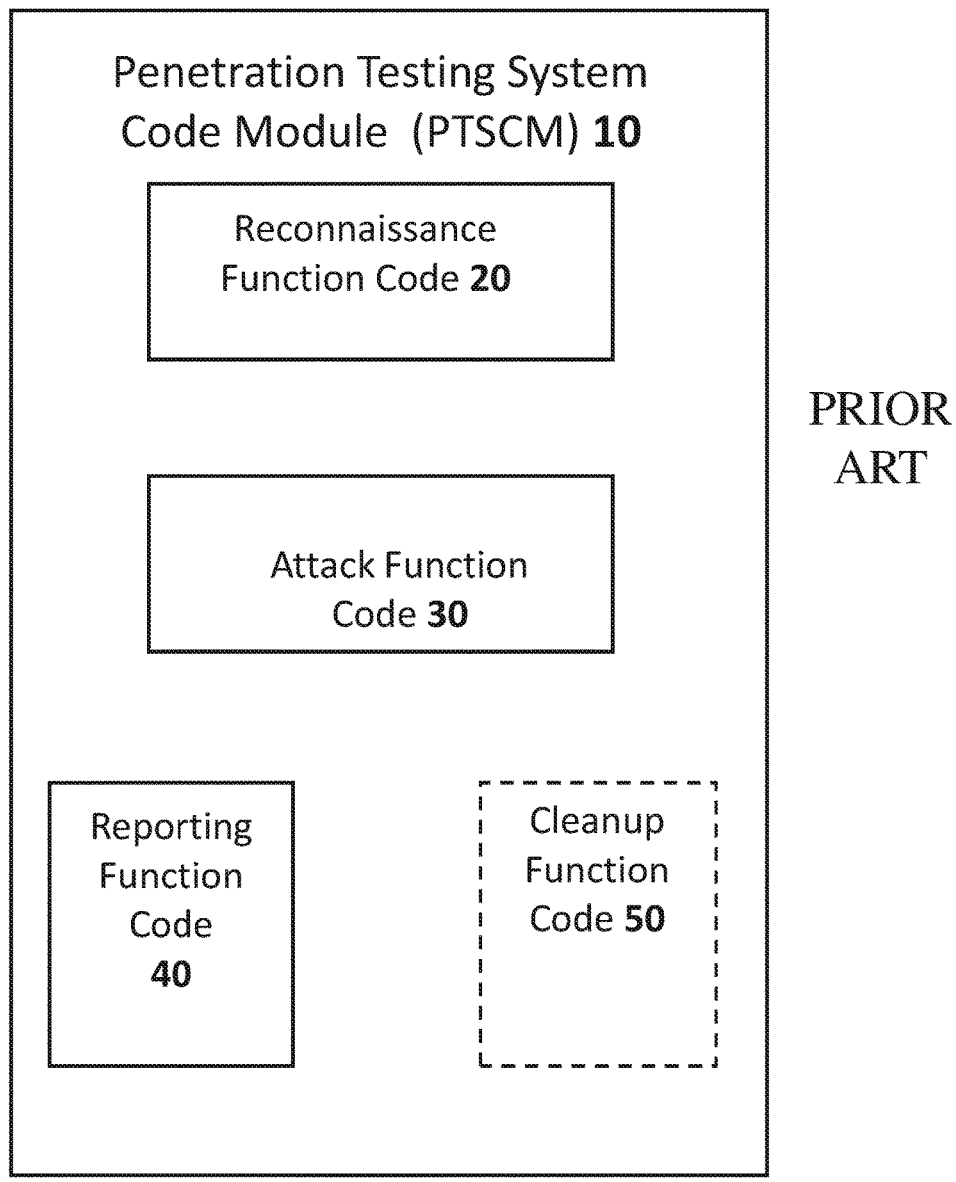
FIG. 1A (PRIOR ART) is a block diagram of code modules of a typical penetration testing system.
Figure 1B:
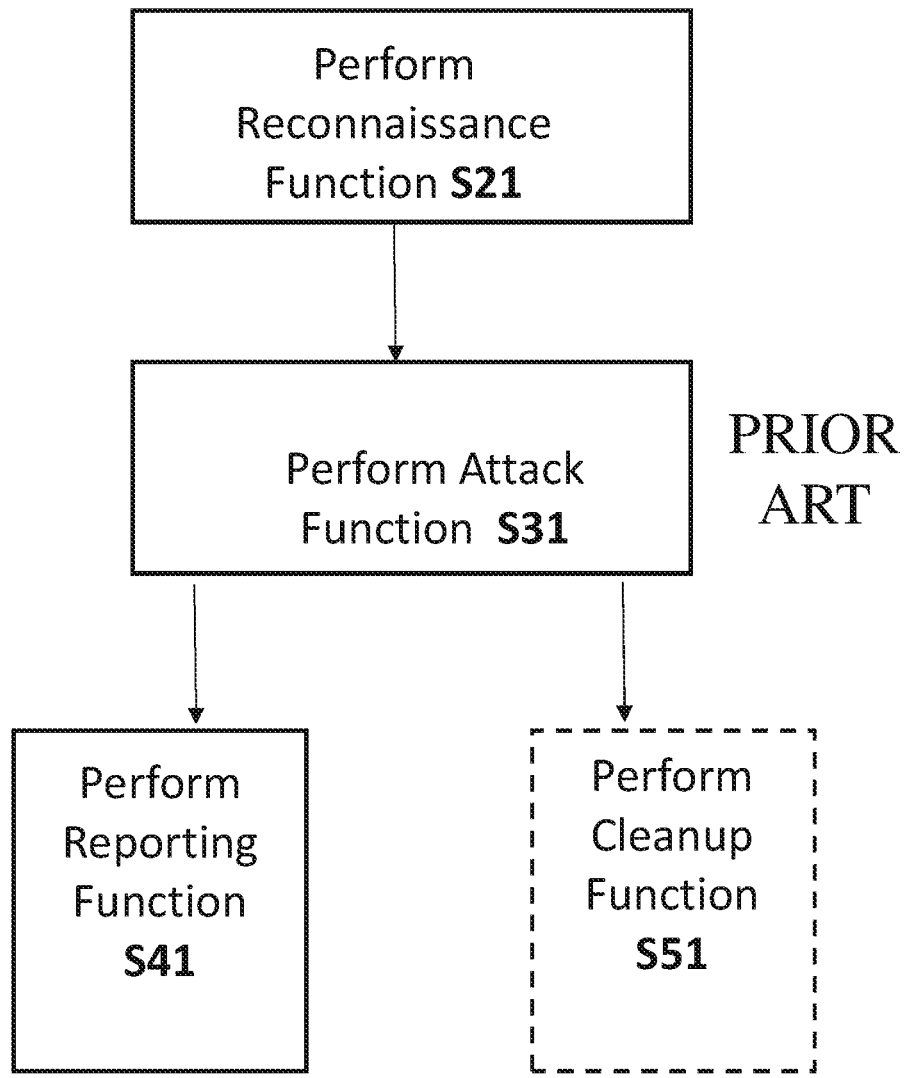
FIG. 1B (PRIOR ART) is a flow-chart related to the system of FIG. 1A.
Figure 2:
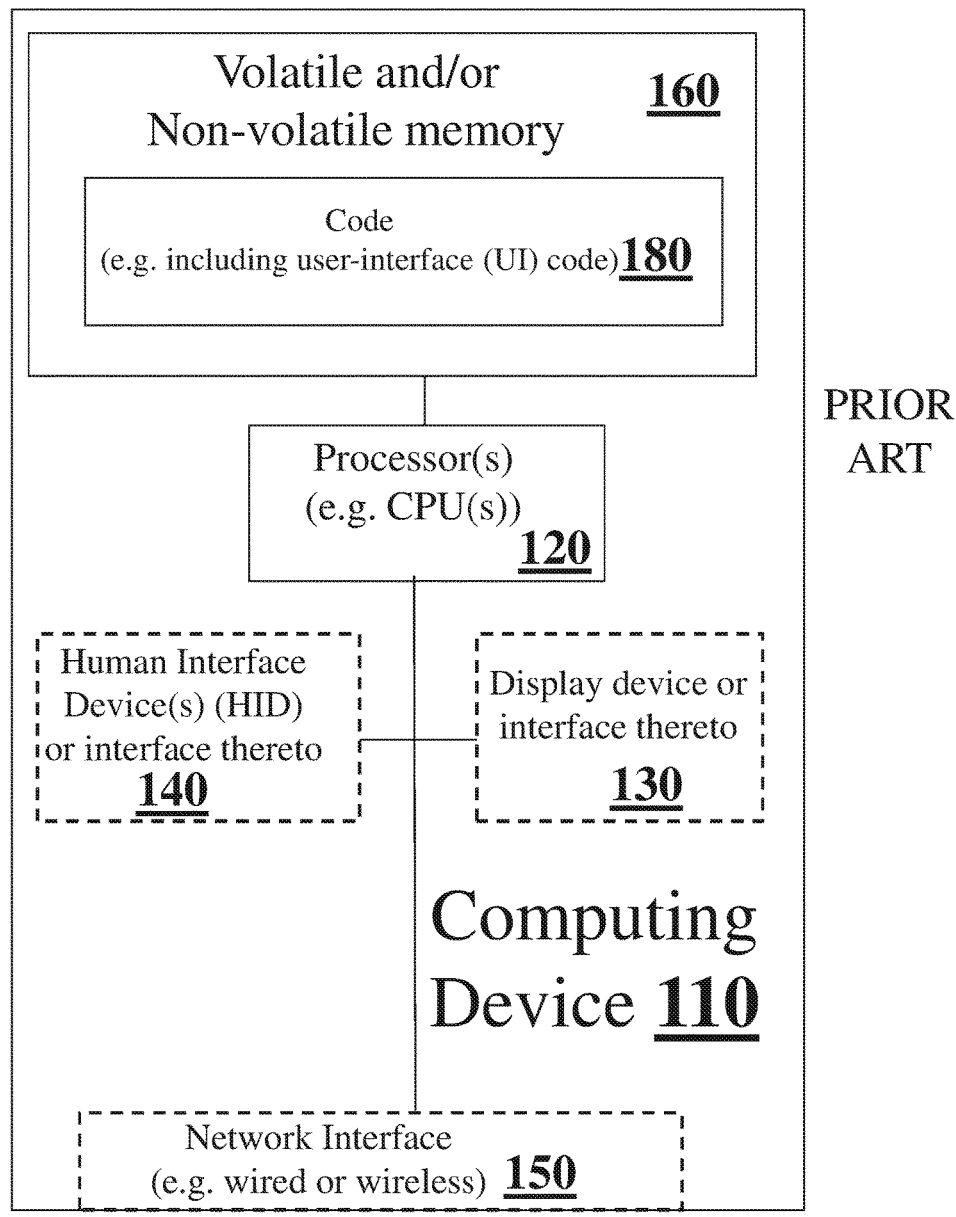
FIG. 2 (PRIOR ART) illustrates a prior art computing device.

The invention, in some embodiments, relates to penetration testing of a networked system, and specifically to manually and explicitly selecting a termination condition of a penetration testing campaign.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically enables flexible selection of termination conditions of a penetration testing campaign.

The proposed solution includes a penetration testing system that provides the user with options to select one or more indirect termination conditions for campaigns executed by the penetration testing system. Once an indirect termination condition is selected by the user for a given campaign and the given campaign starts execution, the proposed penetration testing system repeatedly monitors and evaluates the status of the user-selected termination condition in order to find out if and when the penetration testing campaign should be terminated before reaching its ultimate end. The proposed penetration testing system may optionally also provide the user with options to select direct termination conditions.

The following list contains examples of indirect termination conditions that may be selected by a user of the proposed penetration testing system. The list is not exhaustive, and any termination condition that is not a direct termination condition is within the scope of the proposed invention.

A. Succeeding in exporting outside the networked system of a file having a specific file name from a specific network node.
B. Succeeding in exporting outside the networked system of a file having a specific file name from whatever node of the networked system having a copy of it.
C. Succeeding in exporting outside the networked system of a given number of files from a specific network node.
D. Succeeding in exporting outside the networked system of a given number of files from any nodes.
E. Succeeding in exporting outside the networked system of files having a total size that is more than a given size.
F. Succeeding in exporting outside the networked system of a file of a specific type.
G. Succeeding in exporting outside the networked system of one or more files of a specific type having a total size that is more than a given size.
H. Succeeding in damaging in a specific way a given number of files.
I. Succeeding in damaging in a specific way a file having a specific file name.
J. Succeeding in damaging in a specific way a file having a specific file name in a specific node.
K. Succeeding in damaging in a specific way a given number of files having a specific type.
L. Succeeding in damaging in a specific way at least one file in a specific node.
M. Succeeding in encrypting a given number of files.
N. Succeeding in encrypting a file having a specific file name.
O. Succeeding in encrypting a file having a specific file name in a specific node.
P. Succeeding in encrypting a given number of files having a specific type.
Q. Succeeding in encrypting at least one file in a specific node.
R. Succeeding in compromising a given number of network nodes, without caring which nodes they are (with the given number of nodes larger than one).
S. Succeeding in compromising enough network nodes so that the ratio of the number of already-compromised nodes to the number of not-yet-compromised nodes is higher than a given threshold.
T. Succeeding in compromising enough network nodes so that the difference between the number of already-compromised nodes and the number of not-yet-compromised nodes is higher than a given threshold.
U. Succeeding in compromising enough network nodes so that a percentage of already-compromised nodes in the networked system is higher than a given threshold.
V. Succeeding in compromising a given number of network nodes, all of which are members of a specific subset of the nodes of the tested networked system. The specific subset may be, for example, all the nodes running the Windows 7 Operating system, or all the nodes that are mobile devices.
W. Succeeding in compromising all the network nodes in the networked system that are members of a specific subset of the nodes of the tested networked system. The specific subset of nodes may be defined, for example, by a condition that has to be satisfied by a member node, such as having a cellular communication channel.
X. Detecting that a specific defensive application exists in the tested networked system.
Y. Succeeding in changing access rights of a given number of files.
Z. Succeeding in changing access rights of a file having a specific file name.
AA. Succeeding in changing access rights of a file having a specific file name in a specific node.
AB. Succeeding in changing access rights of a given number of files having a specific type.
AC. Succeeding in changing access rights of at least one file in a specific node.

The user makes his selection of which termination condition to use by operating a console with a GUI supporting selection of some or all of the indirect termination condition options described above, and optionally also supporting selection of one or more indirect termination condition options not described above and/or one or more direct termination condition options. The GUI typically displays to the user a list of termination condition options (e.g. a drop-down list) to select from, but in some embodiments, the user may manually and explicitly enter an indirect termination condition not displayed in the list of options by using an input device such as a keyboard. The console is typically associated with a remote computing device that includes a processor that executes software implementing part or all of the penetration testing software functions during the execution of a campaign. Alternatively, the console may be associated with a separate computing device that is different from the remote computing device executing the campaign, where the two computing devices are in communication with each other.

The GUI used for selecting the indirect termination condition supports the selecting of the general class of the termination condition to be used and, for some termination conditions classes, also the selecting of one or more parameters required for customizing the termination condition class according to the user's needs. For example, when a user selects a termination condition of the class "exporting a specific number of files of a specific type", he must specify two customization parameters: (i) the number of files, and (ii) the file type. The user may select the two parameters so that the resulting termination condition will be, for example, "exporting three Excel files".

The above disclosed ability to select a desired indirect termination condition of a penetration testing campaign is applicable to all architectures of penetration testing systems. This is straight-forward for actual attack penetration testing systems in which network nodes may be actually compromised, as the penetration condition applies to the actual state of the real tested networked system. For example, with a termination condition of exporting an Excel file out of the networked system, checking whether the termination condition is satisfied is carried out by checking whether an Excel file was, in reality, exported out of the real networked system. However, even in simulated or reconnaissance agent penetration testing systems, the selection of a termination condition is still applicable—the condition is evaluated based on the state or status of the simulated networked system or based on results of evaluations of rules about consequences of a potential attacker's moves. In the above Excel file example, checking whether the termination condition is satisfied is carried out by checking whether an Excel file was simulatively exported out of the simulated networked system, or whether it is determined by evaluating the rules of the penetration testing system's knowledge-base that an Excel file could have been exported out of the networked system by the potential attacker.

In all cases except for the actual attack penetration testing systems, when we say that a network node was compromised or that a file was exported out of the networked system, what is actually meant is that in the real world an attacker could have compromised the network node or could have exported the file.

It should be noted that a campaign may have multiple termination conditions active at the same time. For example, in a penetration testing system that is configured to halt when the goal of the attacker is achieved, if the goal in a given campaign is to export one Excel file from any node then the campaign has an implied termination condition of "exporting one Excel file from any node". For the same campaign, the user may explicitly define another termination condition, such as "encrypting one Word file on any node". In this case, the two termination conditions (one direct and one indirect) are unrelated to each other and are both active during the same campaign, with the first one to be satisfied causing the campaign to halt.

The proposed penetration testing system may also support multiple explicitly-selected termination conditions active at the same campaign. This may be achieved by independently selecting multiple termination conditions using the termination condition selection GUI, or alternatively using that GUI for defining a single compound termination condition that is composed of the multiple termination conditions, connected by an "or" logical operator.

As discussed hereinabove, in accordance with the present invention, a user manually and explicitly selects an indirect termination condition for termination of a penetration testing campaign.

Figure 3A:
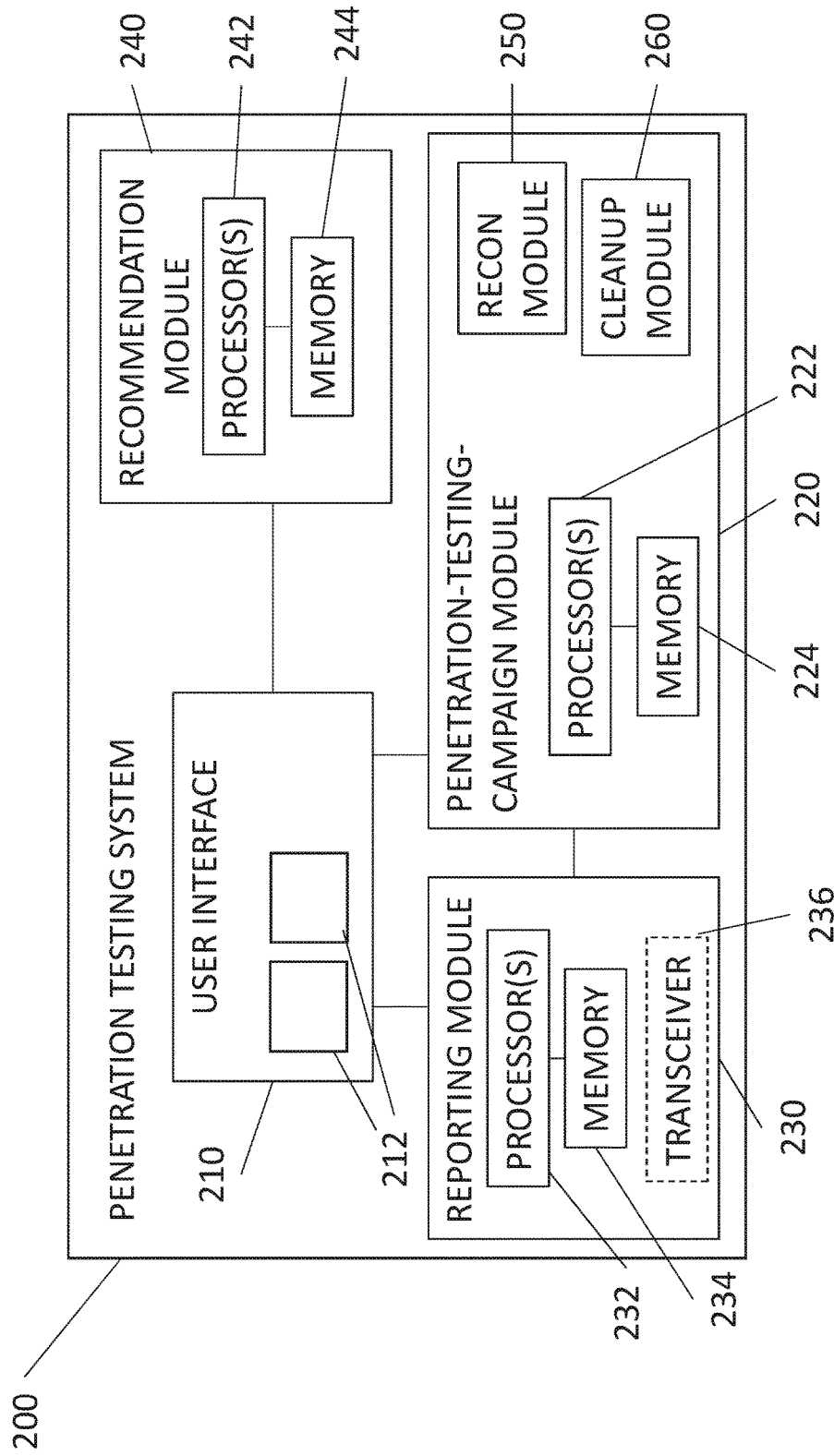
FIG. 3A is a block diagram of a penetration testing system according to an embodiment of the invention.

Reference is now made to FIG. 3A, which is a block diagram of a penetration testing system 200 according to an embodiment of the invention.

As seen in FIG. 3A, the penetration testing system 200 includes a termination-condition-selecting user interface 210, including one or more user interface components 212 for manual and explicit selection of a termination condition for a penetration testing campaign. The user interface resides in, or is in communication with, a computing device.

In accordance with embodiments of the invention, the selected termination condition may be an indirect termination condition, or may be selected from the group consisting of:
  i. a termination condition associated with exporting one or more files out of the networked system;
  ii. a termination condition associated with damaging one or more files;
  iii. a termination condition associated with encrypting one or more files;
  iv. a termination condition associated with a number of compromised network nodes;
  v. a termination condition associated with a specific condition that is either true or false for each network node of the networked system;
  vi. a termination condition associated with a specific defensive software application; and
  vii. a termination condition associated with changing access rights of one or more files.

System 200 further includes a penetration-testing-campaign module 220, functionally associated with user interface 210 and including one or more penetration-testing-campaign processors 222 and a penetration-testing-campaign memory 224, such as a non-transitory computer readable storage medium, having stored thereon instructions to be executed by the one or more penetration-testing-campaign processors 222. The memory 224 has stored instructions to perform a penetration testing campaign so as to test the networked system, and to terminate the penetration testing campaign when a termination condition, manually and explicitly-selected using user interface 210, is satisfied. In some embodiments, the penetration-testing-campaign module 220 includes at least part of the attack module or attack function code of the prior art.

A reporting module 230 is functionally associated with user interface 210 and with penetration-testing-campaign module 220. Reporting module 230 includes one or more reporting processors 232, and a reporting memory 234, such as a non-transitory computer readable storage medium, having stored thereon instructions to be executed by the one or more reporting processors 232. The reporting memory 234 has stored instructions to report at least one security vulnerability detected or determined to exist in the networked system according to results of the penetration testing campaign performed by penetration-testing-campaign module 220. The instructions to report include at least one of:
  (i) instructions to cause a display device (e.g. of user interface 210 or another display device, which may be located remotely to the reporting module 230) to display a report describing the detected security vulnerability;
  (ii) instructions to store the report describing the detected security vulnerability in a file; and
  (iii) instructions to electronically transmit the report describing the detected security vulnerability, for example using a transceiver 236 functionally associated with the reporting module 230.

In some embodiments, the system 200 may further include a recommendation module 240, functionally associated with user interface 210. Recommendation module 240 may include one or more recommendation processors 242, and a recommendation memory 244, such as a non-transitory computer readable storage medium, having stored thereon instructions to be executed by the one or more recommendation processors 242. In some embodiments, the recommendation memory 244 has stored instructions to automatically compute an explicit recommendation for selecting the termination condition for the penetration testing campaign, which is displayed by the user interface 210. In other embodiments, the recommendation memory has stored instructions to automatically compute a list of possible termination conditions for the penetration testing campaign, which list is displayed by user interface 210.

In some embodiments, system 200 further includes a reconnaissance module 250 adapted to carry out a reconnaissance function and/or a cleanup module 260 adapted to carry out a cleanup function as described hereinabove. The penetration-testing-campaign module 220 may include at least part of the reconnaissance module 250 carrying out reconnaissance function code, and/or the cleanup module 260 carrying out cleanup function code.

In some embodiments, the penetration-testing-campaign memory 224, reporting memory 234, and recommendation memory 244 are each a dedicated, and separate, memory component or storage medium. In other embodiments, at least two of the penetration-testing-campaign memory 224, reporting memory 234, and recommendation memory 244 may be part of the same memory component or storage medium.

In some embodiments, the penetration-testing-campaign processor(s) 222, reporting processor(s) 232, and recommendation processor(s) 242 are each dedicated, and separate, processors. In other embodiments, at least two of the penetration-testing-campaign processor(s) 222, reporting processor(s) 232, and recommendation processor(s) share at least one common processor.

Figure 3B:
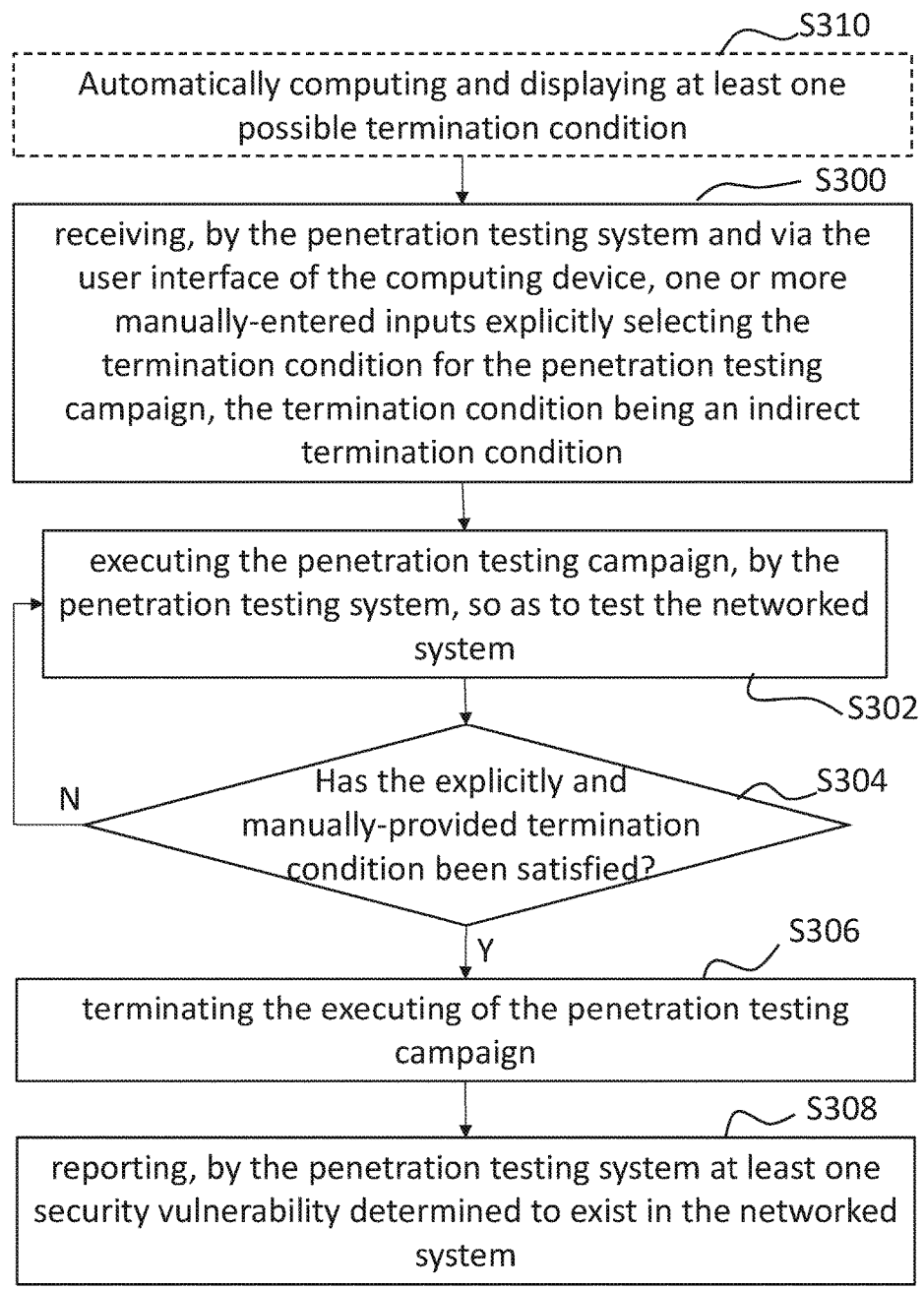
FIG. 3B is a flow chart of a method for penetration testing of a networked system according to an embodiment of the invention.

FIG. 3B is a flow-chart of a method of penetration testing of a networked system by a penetration testing system that is controlled by a user interface of a computing device so that a penetration testing campaign is executed until a manually and explicitly-selected termination condition is satisfied.

In step S300 of FIG. 3B, the penetration testing system receives, for example via the user interface 210 of FIG. 3A, one or more manually-entered inputs, where the one or more manually-entered inputs explicitly select a termination condition for the penetration testing campaign. The selected termination condition is an indirect termination condition. In some embodiments, the selected termination condition is selected from the group consisting of:
  i. a termination condition associated with exporting one or more files out of the networked system;
  ii. a termination condition associated with damaging one or more files;
  iii. a termination condition associated with encrypting one or more files;
  iv. a termination condition associated with a number of compromised network nodes;
  v. a termination condition associated with a specific condition that is either true or false for each network node of the networked system;
  vi. a termination condition associated with a specific defensive software application; and
  vii. a termination condition associated with changing access rights of one or more files.

In some embodiments, the termination condition associated with exporting one or more files out of the networked system includes at least one of:

A termination condition satisfied when the penetration testing system exports or determines that it could export a file having a specific file name out of the networked system;

A termination condition satisfied when the penetration testing system exports or determines that it could export a file, from a specific network node of the networked system, out of the networked system;

A termination condition satisfied when the penetration testing system exports or determines that it could export a specific number of files, from a specific network node of the networked system, out of the networked system;

A termination condition satisfied when the penetration testing system exports or determines that it could export a specific number of files out of the networked system;

A termination condition satisfied when the penetration testing system exports or determines that it could export one or more files, whose total size is more than a specific size, out of the networked system;

A termination condition satisfied when the penetration testing system exports or determines that it could export one or more files of a specific type out of the networked system; and A termination condition satisfied when the penetration testing system exports or determines that it could export one or more files of a specific type, whose total size is more than a specific size, out of the networked system.

In some embodiments, the termination condition associated with damaging one or more files includes at least one of:

A termination condition satisfied when the penetration testing system damages or determines that it could damage in a specific way a specific number of files of the networked system;

A termination condition satisfied when the penetration testing system damages or determines that it could damage in a specific way a file having a specific file name of the networked system;

A termination condition satisfied when the penetration testing system damages or determines that it could damage in a specific way a file having a specific file name in a specific network node of the networked system;

A termination condition satisfied when the penetration testing system damages or determines that it could damage in a specific way a specific number of files having a specific type; and A termination condition satisfied when the penetration testing system damages or determines that it could damage in a specific way at least one file in a specific network node of the networked system.

In some embodiments, the termination condition associated with encrypting one or more files includes at least one of:

A termination condition satisfied when the penetration testing system encrypts or determines that it could encrypt a specific number of files of the networked system;

A termination condition satisfied when the penetration testing system encrypts or determines that it could encrypt a file having a specific file name of the networked system;

A termination condition satisfied when the penetration testing system encrypts or determines that it could encrypt a file having a specific file name in a specific network node of the networked system;

A termination condition satisfied when the penetration testing system encrypts or determines that it could encrypt a specific number of files having a specific type; and A termination condition satisfied when the penetration testing system encrypts or determines that it could encrypt at least one file in a specific network node of the networked system.

In some embodiments, the termination condition associated with a number of compromised network nodes includes at least one of:

A termination condition satisfied when the penetration testing system compromises or determines that it could compromise a specific number larger than one of network nodes, regardless of a specific identity of those compromised network nodes;

A termination condition satisfied when the penetration testing system compromises or determines that it could compromise a number of network nodes such that a ratio of the number of compromised network nodes in the networked system to the number of uncompromised network nodes in the networked system is higher than a specific threshold;

A termination condition satisfied when the penetration testing system compromises or determines that it could compromise a number of network nodes such that a difference between the number of compromised network nodes in the networked system and the number of uncompromised network nodes in the networked system is higher than a specific threshold; and A termination condition satisfied when the penetration testing system compromises or determines that it could compromise a number of network nodes such that a percentage of compromised network nodes in the networked system is higher than a specific threshold.

In some embodiments, the termination condition associated with a specific condition that is either true or false for each network node of the networked system includes at least one of:

A termination condition satisfied when the penetration testing system compromises or determines that it could compromise a specific number of network nodes which satisfy the specific condition; and A termination condition satisfied when the penetration testing system compromises or determines that it could compromise all network nodes of the networked system that satisfy the specific condition.

In some embodiments, the termination condition associated with a specific defensive software application includes a termination condition satisfied when the penetration testing system detects an existence in the networked system of a specific defensive software application (e.g. a McAfee anti-virus).

In some embodiments, the termination condition associated with changing access rights of one or more files includes at least one of:

A termination condition satisfied when the penetration testing system changes access rights or determines that it could change access rights of a specific number of files of the networked system;

A termination condition satisfied when the penetration testing system changes access rights or determines that it could change access rights of a file having a specific file name of the networked system;

A termination condition satisfied when the penetration testing system changes access rights or determines that it could change access rights of a file having a specific file name in a specific network node of the networked system;

A termination condition satisfied when the penetration testing system changes access rights or determines that it could change access rights of a specific number of files having a specific type; and A termination condition satisfied when the penetration testing system changes access rights or determines that it could change access rights of at least one file in a specific network node of the networked system.

Specific examples of step S300 of the flow-chart of FIG. 3B are discussed below with reference to FIGS. 4A-4B and 5.

In step S302 of FIG. 3B, the penetration testing campaign is executed by the penetration testing system, for example by penetration-testing-campaign module 220 of FIG. 3A, so as to test the networked system. In step S304, which occurs during execution of the penetration testing campaign, the penetration testing system checks whether the explicitly and manually selected termination condition, received in step S300, is satisfied.

If in step S304 it is established that the termination condition has not been satisfied, execution of the penetration testing campaign continues. Otherwise, if the termination condition has been satisfied, in step S306 the execution of the penetration testing campaign is terminated, and at step S308 the penetration testing system reports at least one security vulnerability determined to exist in the networked system by the execution of the penetration testing campaign, for example by reporting module 230 of FIG. 3A. The reporting comprises at least one of:

(i) causing a display device to display a report describing the security vulnerability, (ii) storing the report describing the security vulnerability in a file, and (iii) electronically transmitting (e.g. over a computer network) (for example, from the computing device mentioned in step S300 to another computing device) a report describing the security vulnerability.

In one example, in which the reporting at step S308 comprises causing a display device to display a report describing the security vulnerability, a computing device that performs the reporting causes a local display device (e.g. either residing in a common housing with the computing device that performs the reporting or connected via a local device interface) to display the report.

Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory of the computing device that performs the reporting, and the reporting step may be completed only after some delay (e.g. even a delay of weeks or months or years).

In some embodiments, a step S310 may precede step S300. In step S310 the penetration testing system, for example recommendation module 240 of FIG. 3A, automatically computes and displays one or more explicit recommendations for termination condition. In some such embodiments, in which multiple such recommendations are displayed, the possible termination conditions are displayed as a list (e.g. a drop-down list). The user may then select one of the recommended termination conditions (or the only recommended termination condition) in step S300, or may reject the proposed termination condition(s) and select another termination condition to be used in the penetration testing campaign.

Figure 4A:
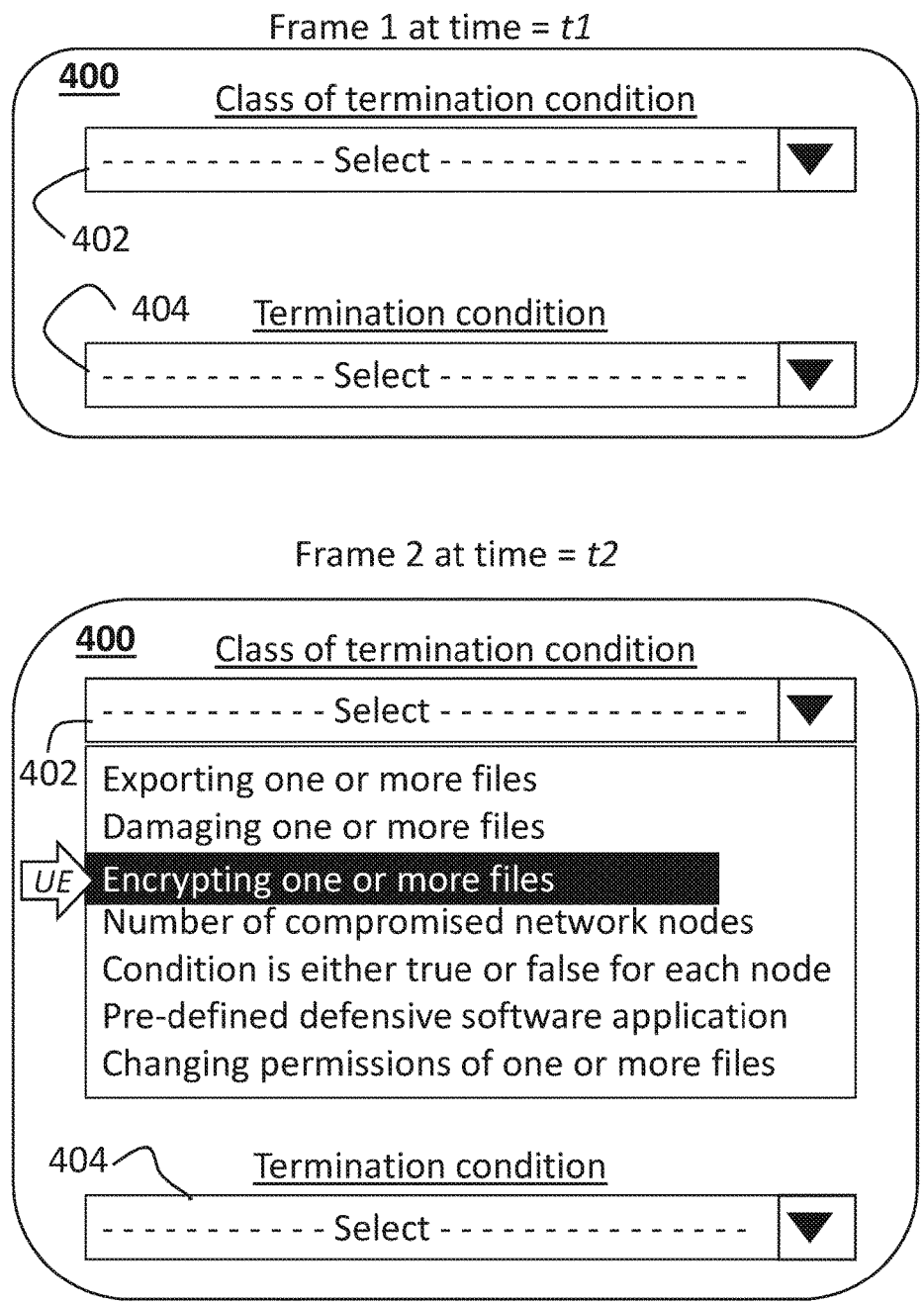
FIGS. 4A and 4B together illustrate a first example of user engagements of a user interface according to a first embodiment of the invention.
Figure 4B:
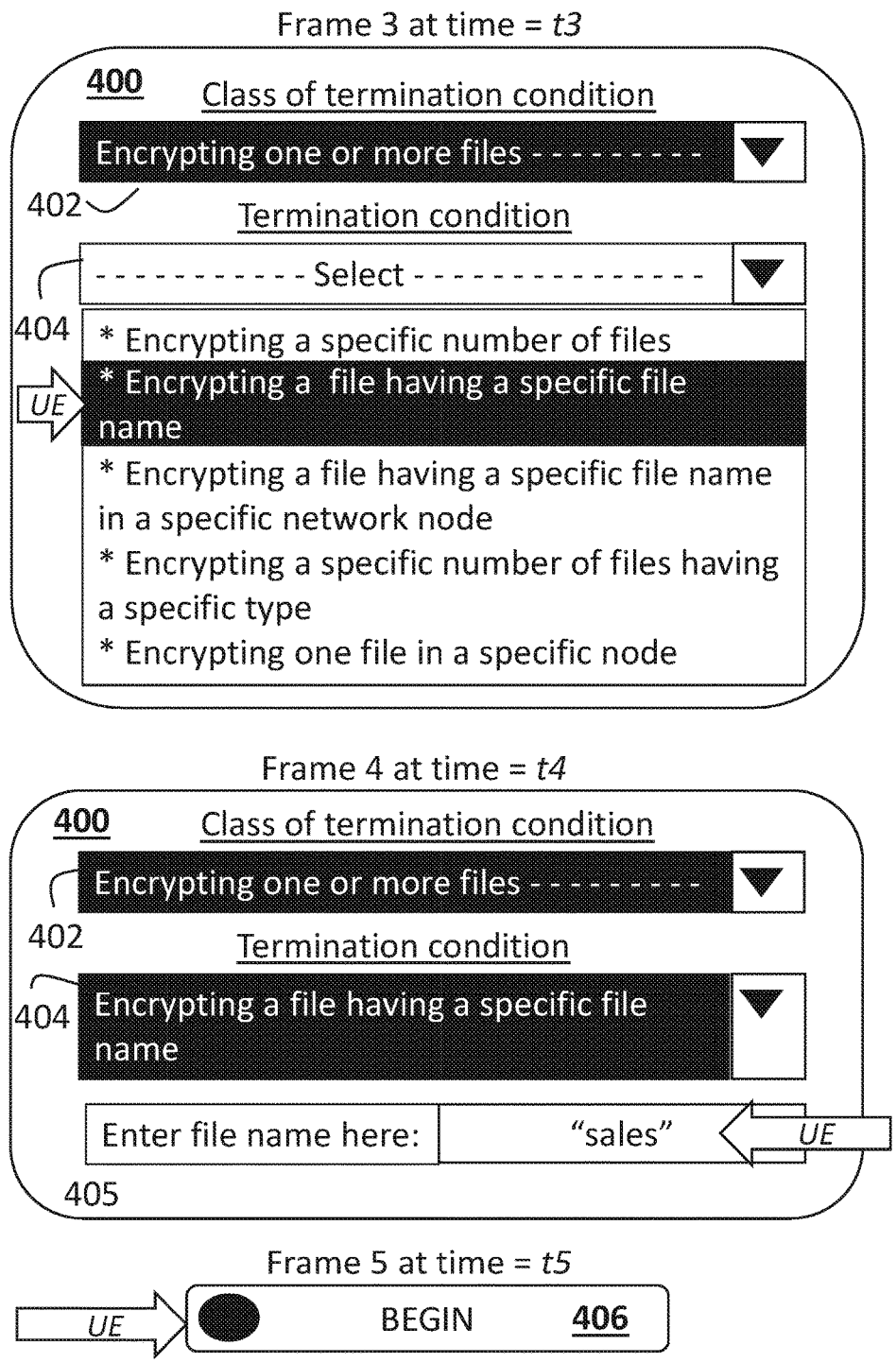

Reference is now made to FIGS. 4A and 4B, which together illustrate a first example of user engagements of a user interface for receiving a manually and explicitly selected termination condition in step S300 of FIG. 3B.

In a first example presented in FIGS. 4A and 4B, a GUI element 400 allows the user to manually and explicitly select an indirect termination condition for a penetration testing campaign. In the embodiment illustrated in FIG. 4A, the user may initially select a class of indirect termination conditions from a first drop down menu 402, then select a specific termination condition within the selected class from a second drop down menu 404, and finally provide additional required information in a text-box 405.

FIGS. 4A and 4B present five frames—Frame 1 at time t1 (FIG. 4A), Frame 2 at time t2 (FIG. 4A), Frame 3 at time t3 (FIG. 4B), Frame 4 at time t4 (FIG. 4B), and Frame 5 at time t5 (FIG. 4B).

In Frame 1, no selection has yet been made by the user. In Frame 2, at time t2 the user selects the class of termination conditions to be used—e.g. the user engagement of drop down menu 402 of GUI element 400 may be provided by a mouse-click. In the first example illustrated in FIGS. 4A and 4B the user selects the class of termination conditions associated with encrypting one or more files.

In Frame 3, at time t3 the user selects a specific termination condition to be used from a list of termination conditions in the class selected at time t2—e.g. the user engagement of drop down menu 404 of GUI element 400 may be provided by a mouse-click. In the illustrated example, the user selects a termination condition of the selected class, which condition is satisfied when the penetration testing campaign succeeds in encrypting, or determines that it could encrypt, a file having a specific file name. In frame 4, at time t4 the user provides additional information required for the termination condition selected at time t3—e.g. the user engagement with text-box 405 of GUI element 400 may be provided by using a keyboard. In the illustrated example, the user provides in text-box 405 the specific file name of the file which should be encrypted, here illustrated as the name "sales". As such, the selected termination condition is satisfied when a file having the name "sales" is encrypted or when it is determined that the file could have been encrypted.

In Frame 5 of FIG. 4B at time t5, when the user's mouse-pointer is located within a 'begin' button 406 of the GUI, the user provides a mouse-click, thereby triggering steps S302 to S308 of the method of FIG. 3B.

Figure 5A:
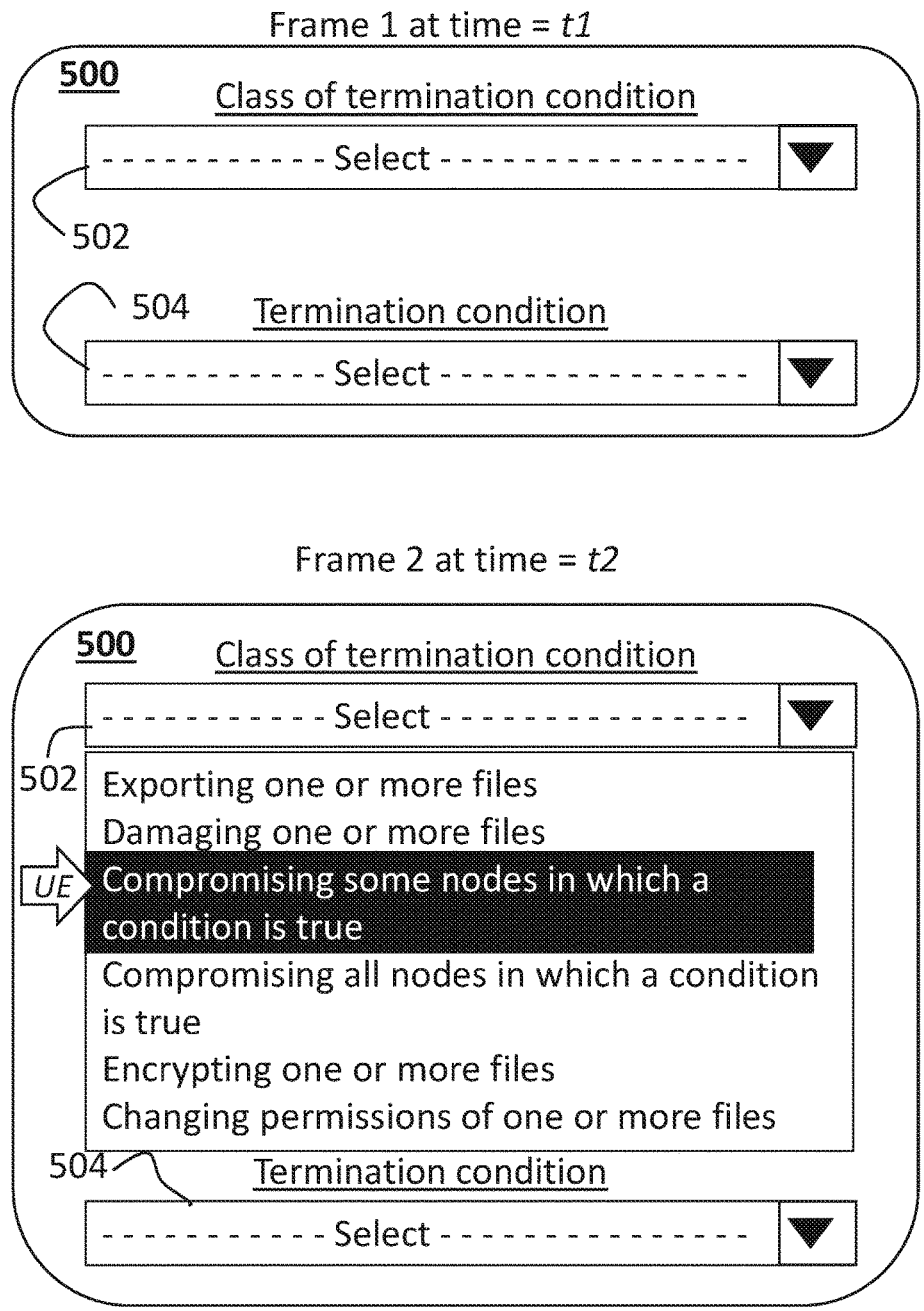
FIGS. 5A and 5B together illustrate a second example of user engagements of a user interface according to a second embodiment of the invention.
Figure 5B:
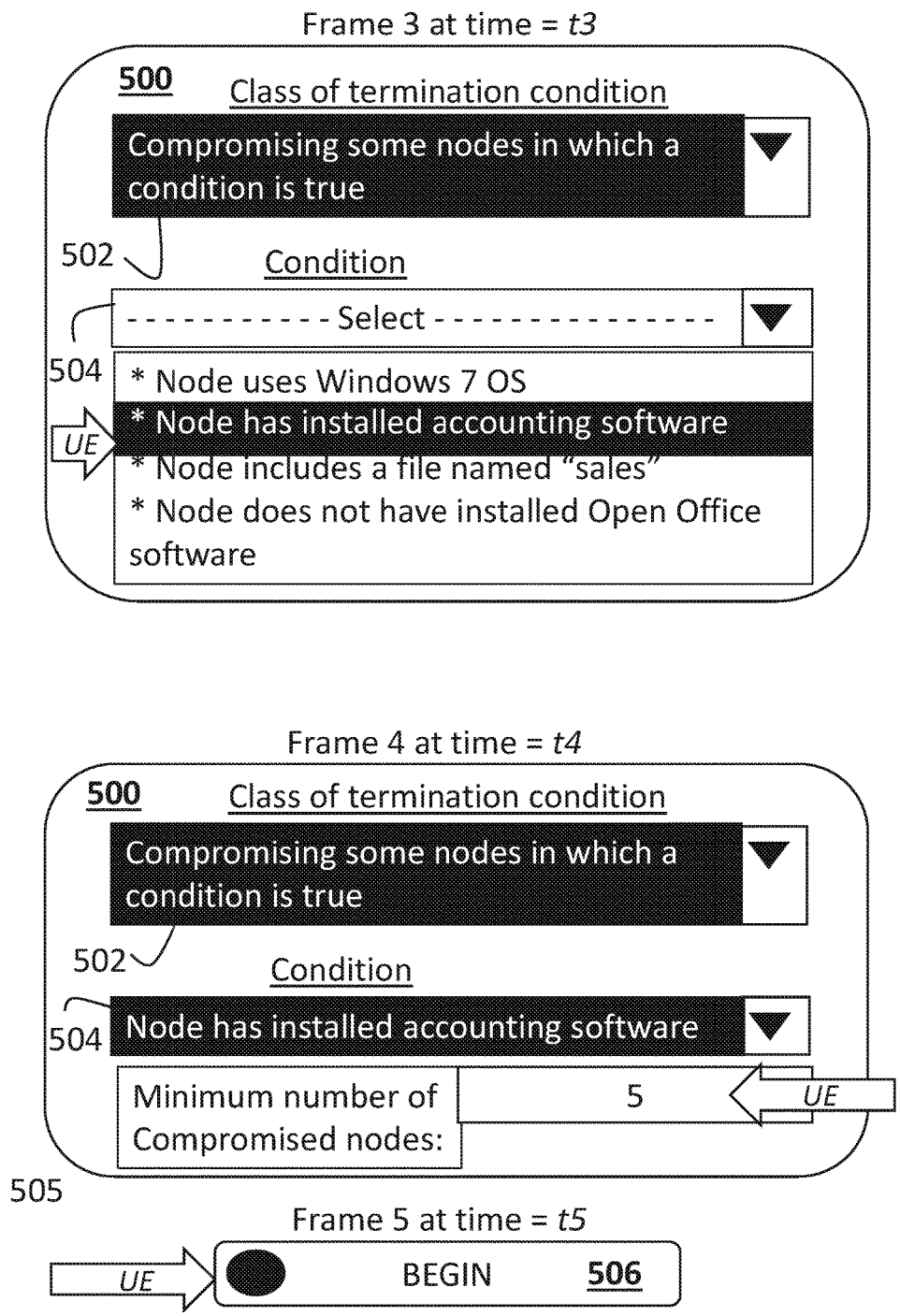

Reference is now made to FIGS. 5A and 5B, which together illustrate a second example of user engagements of a user interface for receiving a manually and explicitly selected termination condition in step S300 of FIG. 3B.

In a second example presented in FIG. 5A, a GUI element 500 allows the user to manually and explicitly select an indirect termination condition for a penetration testing campaign. In the embodiment illustrated in FIGS. 5A and 5B, the user may initially select a class of indirect termination conditions from a first drop down menu 502, then select a specific termination condition within the selected class from a second drop down menu 504, and finally provide additional required information in a text-box 505.

FIGS. 5A and 5B present five frames—Frame 1 at time t1 (FIG. 5A), Frame 2 at time t2 (FIG. 5A), Frame 3 at time t3 (FIG. 5B), Frame 4 at time t4 (FIG. 5B), and Frame 5 at time t5 (FIG. 5B).

In Frame 1, no selection has yet been made by the user. In Frame 2, at time t2 the user selects the class of termination conditions to be used—e.g. the user engagement of drop down menu 502 of GUI element 500 may be provided by a mouse-click. In the specific example illustrated in FIGS. 5A and 5B, the user selects a class of termination conditions associated with compromising some nodes for which a specific condition is true.

In Frame 3, at time t3 the user selects a specific termination condition to be used from a list of termination conditions available in the class selected at time t2—e.g. the user engagement of drop down menu 504 of GUI element 500 may be provided by a mouse-click. When the selected class is that of termination conditions satisfied when a specific number of nodes for which a Boolean condition is true are compromised, the list of conditions proposed by drop down menu 504 includes possible Boolean conditions which may be evaluated for each node. In the illustrated example, the user selected to terminate the penetration testing campaign when enough nodes having accounting software installed on them are compromised.

In frame 4, at time t4 the user provides additional information required for the termination condition selected so far—e.g. the user engagement with text-box 505 of GUI element 500 may be provided by using a keyboard. In the illustrated example, the user specifies the minimal number of nodes, fulfilling the selected Boolean condition, which must be compromised. In the example shown in FIG. 5B, the user entered the number '5' such that the selected termination condition is satisfied when at least five nodes which have installed thereon accounting software have been compromised, or it is determined that the nodes could have been compromised.

In Frame 5 of FIG. 5B at time t5, when the user's mouse-pointer is located within a 'begin' button 506 of the GUI, the user provides a mouse-click, thereby triggering steps S302 to S308 of the method of FIG. 3B.

In a third example presented in FIG. 6, the penetration testing system presents one or more recommended indirect termination conditions to the user within a GUI element 600. The user may manually and explicitly select one of the recommended indirect termination conditions for a penetration testing campaign.

FIG. 6 presents three frames—Frame 1 at time t1, Frame 2 at time t2, and Frame 3 at time t3.

In Frame 1, a list of recommended termination conditions is displayed to the user as described hereinabove with respect to step S310 of FIG. 3B, but no selection has yet been made by the user. In Frame 2, at time t2 the user selects one of the recommended termination conditions to be used—e.g. the user engagement of GUI element 600 may be provided by a mouse-click. In the illustrated example, the user has selected a termination condition satisfied when at least one file from node "CEO" is exported, or could be exported.

In Frame 3 of FIG. 6 at time t3, when the user's mouse-pointer is located within a 'begin' button 606 of the GUI, the user provides a mouse-click, thereby triggering steps S302 to S308 of the method of FIG. 3B.

Figure 7:
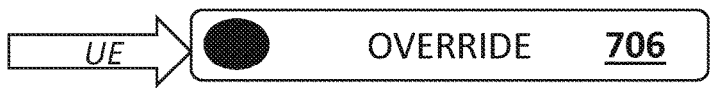
FIG. 7 illustrates a fourth example of user engagements of a user interface according to a fourth embodiment of the invention.

In a fourth example presented in FIG. 7, the penetration testing system presents one or more recommended indirect termination conditions to the user within a GUI element 700, in a similar manner to that shown in FIG. 6. The user may manually and explicitly select one of the recommended indirect termination conditions for a penetration testing campaign, or may override the recommendations.

FIG. 7 presents three frames—Frame 1 at time t1, Frame 2 at time t2, and Frame 3 at time t3.

In Frame 1, a list of recommended termination conditions is displayed to the user as described hereinabove with respect to step S310 of FIG. 3B, but no selection has yet been made by the user. In Frame 2, at time t2 the user selects to override the recommended termination condition, and not to use any of the recommended termination conditions—e.g. when the user's mouse-pointer is located within an 'override' button 706 of the GUI, the user provides a mouse-click, thereby overriding the proposed termination conditions.

As a result, in Frame 3, the user is presented a with a GUI element 710 which allows the user to manually and explicitly select an indirect termination condition for a penetration testing campaign by selecting a class of indirect termination conditions from a first drop down menu 712, and then to select a specific termination condition within the selected class from a second drop down menu 714, as described hereinabove with reference to FIGS. 4A to 5B.

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

9. "vulnerability management"—A cyclical practice of identifying, classifying, remediating, and mitigating vulnerabilities of network nodes in a networked system.

10. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process, which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (ii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

11. "automated penetration testing"—Penetration testing in which at least one of the reconnaissance function, the attack function and the reporting function is at least partially automated.

12. "penetration testing system"—A system capable of performing penetration testing, regardless if composed of hardware, software or combination of both.

13. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

14. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

15. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (ii) electronically transmitting a report including information about the results of the penetration testing.

The functionality of a reporting function may be implemented by software executing in a remote computing device, for example in the computing device implementing the attack function of the penetration testing.

16. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

17. "a campaign of penetration testing" or "penetration testing campaign"—A specific run of a specific test of a specific networked system by the penetration testing system.

18. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

19. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

20. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

21. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

22. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

23. "attacker" or "threat actor"—An entity, whether a single person, a group of persons or an organization, that might conduct an attack against a networked system by penetrating it for uncovering its security vulnerabilities and/or for compromising it.

24. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

25. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.
An attacker can have one or multiple capabilities.

26. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

27. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

28. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

29. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

30. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

31. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

32. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

33. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

34. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

35. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

36. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

37. "resource of a networked system"—A file in a network node of the networked system, a folder in a network node of the networked system, credentials of a user of the networked system, a peripheral device of a network node of the networked system, or a peripheral device directly attached to a network of the networked system.

38. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

39. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

40. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

41. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

42. "session-hijacking attack"—a cyber-attack where a valid communication session between two network nodes in a networked system is used by an attacker to gain unauthorized access to information or services in the networked computer system.

43. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

44. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

45. "administrator of a network node"—Any person that is authorized, among other things, to define or change at least one rule controlling at least one of an access right, a permission, a priority and a configuration in the network node.

46. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

47. "remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

48. "free event of/in a network node"—An event occurring in the network node which is initiated in and by the network node and is not directly caused or triggered by an entity outside that network node. A free event of a network node may be initiated by a user of the network node, by an operating system of the network node or by an application executing on the network node. A free event of a network node may be either an internal event or a non-internal event of the network node. Examples of free events of a network node are the insertion or removal of a USB removable storage device into/from a socket of the network node, the sending of a query to a web server in response to a user manually entering the query, the sending of an ARP request message by the network node while initializing the network node after manually powering it up, and the sending of a WPAD message by the network node in response to manually typing by the user of a URL into a browser's address input box. Examples of events of a network node that are not free events are the receiving of a network message by the network node, and the sending of a network message by the network node that is done in response to receiving another network message from another network node.

49. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.

For the sake of the above defined terms the singular and plural forms are equivalent—"criterion" and "criteria" are used interchangeably, and so are "condition" and "conditions".

The condition may be a simple condition (for example "the number of already compromised nodes in the tested networked system is five or more") or a compound condition composed of multiple simple conditions and one or more logical operators (for example "a file named company_budget.xls is exported out of the tested networked system from any network node, or at least ten files were encrypted by the attacker in the network node used by the organization's CFO"). A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day.

A halting condition may be either a direct halting condition or an indirect halting condition.

50. "direct termination condition of a campaign" (or its alternate forms corresponding to the alternate forms listed in the definition of "termination condition of a campaign")—A termination condition of a campaign that is at least one of ((i) target-nodes-based termination condition of the campaign, (ii) target-applications-based termination condition of the campaign, (iii) time-based termination condition of the campaign, and (iv) goal-reaching termination condition of the campaign.

51. "target-nodes-based termination condition of a campaign"—A termination condition of the campaign that is satisfied when one or more specific network nodes are compromised. For example, the user may select one target node in the tested networked system (e.g. a network node associated with the CFO of the organization owning the networked system) and define that the test should terminate when that target node is compromised. As another example, the user may select multiple target nodes in the tested networked system and define that the test should terminate when all those target nodes are compromised or when any one of those target nodes is compromised.

52. "target-applications-based terminating condition of a campaign"—A termination condition of the campaign that is satisfied when one or more specific software applications are compromised. For example, the user may select one target software application (e.g. a certain financial software application used by the organization owning the tested networked system) and define that the test should terminate when that target software application is compromised in any node of the networked system. As another example, the user may select multiple target software applications and define that the test should terminate when at least two of those software applications are compromised, regardless if on the same node or on different nodes.

53. "time-based termination condition of a campaign"—A termination condition of the campaign that depends on time, either on execution time of the campaign or on the time of day. For example, the user may define that the campaign should terminate after executing for six hours. As another example, the user may define that the test should halt at 3 am.

54. "goal-reaching termination condition of a campaign"—A termination condition of the campaign that is satisfied if and when the goal of the attacker of the campaign is reached. For example, if the goal of the attacker is "compromise at least five network nodes" and the penetration testing system is configured to terminate when reaching the goal, then the termination condition "at least five network nodes are already compromised" is a goal-reaching termination condition.

As suggested by the above example, a goal-reaching termination condition is typically implied and not explicitly defined by a user, but this does not have to be so—with the above goal example of "compromise at least five network nodes", even if the user manually and explicitly defined the termination condition to be "at least five network nodes are already compromised", this termination condition is still a goal-reaching termination condition because it is satisfied when the goal is reached.

55. "indirect termination condition of a campaign" (or its alternate forms corresponding to the alternate forms listed in the definition of "termination condition of a campaign")—A termination condition of the campaign that is not a direct termination condition of the campaign. Examples of indirect termination conditions are terminating when exporting (or being able to export) a specific file of a specific type from a specific node to the attacker outside the networked system, terminating when exporting (or being able to export) any file of a specific type from whatever node having a copy of it to the attacker outside the networked system, terminating when damaging (or being able to damage) in a specific way a specific number of files of a specific type, and terminating when changing access rights (or being able to change access rights) of a specific number of files of any type.

56. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

57. "explicitly selecting"—Directly and clearly selecting, by a human user, of one option out of multiple options available to human user, leaving no room for doubt and not relying on making deductions by a computing device.

Examples of explicit selections are (i) selection of a specific termination condition from a drop-down list of termination conditions, (ii) selection of specific one or more termination conditions by marking one or more check boxes in a group of multiple check boxes corresponding to multiple termination conditions, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more termination conditions by selecting a specific scenario of a penetration testing system from a pre-defined library of scenarios, where the specific scenario includes the one or more termination conditions, and (ii) selection of specific one or more termination conditions by selecting a specific goal of an attacker, accompanied by a deduction by a computing device concluding that the specific one or more termination conditions must be selected because of the specific goal.

58. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more termination conditions by (a) receiving from a user an explicit selection of a specific scenario of a penetration testing system from a pre-defined library of scenarios, (b) determining by the computing device that the specific scenario includes the one or more termination conditions, and (c) deducing by the computing device that the user wants to select the one or more termination conditions.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

59. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

60. "macro language"—A programming language which is embedded inside a software application (e.g., inside a word processor or a spreadsheet application). A software application in which a macro language is embedded is said "to support the macro language", and is a "macro-supporting software application".

61. "macro"—A sequence of commands written in a macro language.

62. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

63. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

64. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of penetration testing of a networked system by a penetration testing system that is controlled by a user interface of a computing device so that a penetration testing campaign is executed until a termination condition is satisfied, the termination condition being manually and explicitly selected, the method comprising:
 a. receiving, by the penetration testing system and via the user interface of the computing device, one or more manually-entered inputs, the one or more manually-entered inputs explicitly selecting the termination condition for the penetration testing campaign, the termination condition being a member of the termination conditions group consisting of:
  i. a termination condition associated with exporting one or more files out of the networked system;
  ii. a termination condition associated with damaging one or more files;
  iii. a termination condition associated with encrypting one or more files;
  iv. a termination condition associated with a number of compromised network nodes;
  v. a termination condition associated with a specific condition that is either true or false for each network node of the networked system;
  vi. a termination condition associated with a specific defensive software application; and
  vii. a termination condition associated with changing access rights of one or more files;
 b. executing the penetration testing campaign, by the penetration testing system, so as to test the networked system;
 c. checking, by the penetration testing system and while the penetration testing campaign is executing, whether the explicitly and manually-selected termination condition that is a member of the termination conditions group is satisfied;
 d. in response to a determination by the checking that the explicitly and manually-selected termination condition that is a member of the termination conditions group is satisfied, terminating execution of the penetration testing campaign; and
 e. reporting, by the penetration testing system, at least one security vulnerability determined to exist in the networked system by the executing of the penetration testing campaign, wherein the reporting comprises at least one of (i) causing a display device to display a report describing the at least one security vulnerability, (ii) storing the report describing the at least one security vulnerability in a file and (iii) electronically transmitting the report describing the at least one security vulnerability.

2. The method of claim 1, wherein the termination condition is associated with exporting one or more files out of the networked system.

3. The method of claim 2, wherein the termination condition is satisfied when the penetration testing system exports or determines that it could export a file having a specific file name out of the networked system.

4. The method of claim 2, wherein the termination condition is satisfied when the penetration testing system exports or determines that it could export a file, from a specific network node of the networked system, out of the networked system.

5. The method of claim 2, wherein the termination condition is satisfied when the penetration testing system exports or determines that it could export a specific number of files, from a specific network node of the networked system, out of the networked system.

6. The method of claim 2, wherein the termination condition is satisfied when the penetration testing system exports or determines that it could export a specific number of files out of the networked system.

7. The method of claim 2, wherein the termination condition is satisfied when the penetration testing system exports or determines that it could export one or more files, whose total size is more than a specific size, out of the networked system.

8. The method of claim 2, wherein the termination condition is satisfied when the penetration testing system exports or determines that it could export one or more files of a specific type out of the networked system.

9. The method of claim 2, wherein the termination condition is satisfied when the penetration testing system exports or determines that it could export one or more files of a specific type, whose total size is more than a specific size, out of the networked system.

10. The method of claim 1, wherein the termination condition is associated with damaging one or more files.

11. The method of claim 10, wherein the termination condition is satisfied when the penetration testing system damages or determines that it could damage in a specific way a specific number of files of the networked system.

12. The method of claim 10, wherein the termination condition is satisfied when the penetration testing system damages or determines that it could damage in a specific way a file having a specific file name of the networked system.

13. The method of claim 10, wherein the termination condition is satisfied when the penetration testing system damages or determines that it could damage in a specific way a file having a specific file name in a specific network node of the networked system.

14. The method of claim 10, wherein the termination condition is satisfied when the penetration testing system damages or determines that it could damage in a specific way at least one file in a specific network node of the networked system.

15. The method of claim 1, wherein the termination condition is associated with encrypting one or more files.

16. The method of claim 1, wherein the termination condition is associated with a number of compromised network nodes.

17. The method of claim 16, wherein the termination condition is satisfied when the penetration testing system compromises or determines that it could compromise a specific number larger than one of network nodes, regardless of a specific identity of those compromised network nodes.

18. The method of claim 16, wherein the termination condition is satisfied when the penetration testing system compromises or determines that it could compromise a number of network nodes such that a percentage of compromised network nodes in the networked system is higher than a specific threshold.

19. The method of claim 1, wherein the termination condition is associated with a specific condition that is either true or false for each network node of the networked system.

20. The method of claim 19, wherein the termination condition is satisfied when the penetration testing system compromises or determines that it could compromise a specific number of network nodes which satisfy the specific condition.

21. The method of claim 19, wherein the termination condition is satisfied when the penetration testing system compromises or determines that it could compromise all network nodes of the networked system that satisfy the specific condition.

22. The method of claim 1, wherein the termination condition is satisfied when the penetration testing system detects an existence in the networked system of a specific defensive software application.

23. The method of claim 1, wherein the termination condition is associated with changing access rights of one or more files.

24. The method of claim 1, wherein before the receiving the one or more manually-entered inputs that explicitly select the termination condition for the penetration testing campaign, the penetration testing system automatically computes and displays an explicit recommendation for selecting the termination condition.

25. The method of claim 24 wherein the received one or more manually-entered inputs comprises an explicit user approval of the explicit recommendation.

26. The method of claim 1, wherein before the receiving the one or more manually-entered inputs that explicitly select the termination condition for the penetration testing campaign, the penetration testing system automatically computes and displays a list of possible termination conditions.

27. The method of claim 26 wherein the received one or more manually-entered inputs comprises an explicit user selection of one of said possible termination conditions in said list as the termination condition for the penetration testing campaign.

28. A method of penetration testing of a networked system by a penetration testing system that is controlled by a user interface of a computing device so that a penetration testing campaign is executed until a termination condition is satisfied, the termination condition being manually and explicitly selected, the method comprising:
   a. receiving, by the penetration testing system and via the user interface of the computing device, one or more manually-entered inputs, the one or more manually-entered inputs explicitly selecting the termination condition for the penetration testing campaign, the termination condition being an indirect termination condition;
   b. executing the penetration testing campaign, by the penetration testing system, so as to test the networked system;
   c. checking, by the penetration testing system and while the penetration testing campaign is executing, whether the explicitly and manually-selected indirect termination condition is satisfied;
   d. in response to a determination by the checking that the explicitly and manually-selected indirect termination condition is satisfied, terminating execution of the penetration testing campaign; and
   e. reporting, by the penetration testing system, at least one security vulnerability determined to exist in the networked system by the executing of the penetration testing campaign, wherein the reporting comprises at least one of (i) causing a display device to display a report describing the at least one security vulnerability, (ii) storing the report describing the at least one security vulnerability in a file and (iii) electronically transmitting the report describing the at least one security vulnerability.

29. A system of penetration testing of a networked system, the system comprising:
   a. a termination-condition-selecting user interface including one or more user interface components for manual and explicit selection of a termination condition for a penetration testing campaign, where the termination-condition-selecting user interface resides in a computing device, the termination condition being a member of the termination conditions group consisting of:
      i. a termination condition associated with exporting one or more files out of the networked system;
      ii. a termination condition associated with damaging one or more files;
      iii. a termination condition associated with encrypting one or more files;
      iv. a termination condition associated with a number of compromised network nodes;
      v. a termination condition associated with a specific condition that is either true or false for each network node of the networked system;
      vi. a termination condition associated with a specific defensive software application; and
      vii. a termination condition associated with changing access rights of one or more files;
   b. a penetration-testing-campaign module including:
      i. one or more penetration-testing-campaign processors; and
      ii. a penetration-testing-campaign non-transitory computer readable storage medium for instructions execution by the one or more penetration-testing-campaign processors, the penetration-testing-campaign non-transitory computer readable storage medium having stored instructions to perform the penetration testing campaign so as to test the networked system, and to terminate the penetration testing campaign in response to a determination that the manually and explicitly-selected termination condition that is a member of the termination conditions group is satisfied; and
   c. a reporting module including:
      i. one or more reporting processors; and
      ii. a reporting non-transitory computer readable storage medium for instructions execution by the one or more reporting processors, the reporting non-transitory computer readable storage medium having stored instructions to report at least one security vulnerability determined to exist in the networked system according to results of the penetration testing campaign performed by the penetration-testing-campaign module, the instructions to report including at least one of (i) instructions to cause a display device to display a report describing the at least one security vulnerability, (ii) instructions to store the report describing the at least one security vulnerability in a file and (iii) instructions to electronically transmit the report describing the at least one security vulnerability.

30. A system of penetration testing of a networked system, the system comprising:
   a. a termination-condition-selecting user interface including one or more user interface components for manual and explicit selection of a termination condition for a penetration testing campaign, where the terminationcondition-selecting user interface resides in a computing device, the termination condition being an indirect termination condition;

b. a penetration-testing-campaign module including:

i. one or more penetration-testing-campaign processors; and ii. a penetration-testing-campaign non-transitory computer readable storage medium for instructions execution by the one or more penetration-testing-campaign processors, the penetration-testing-campaign non-transitory computer readable storage medium having stored instructions to perform the penetration testing campaign so as to test the networked system, and to terminate the penetration testing campaign in response to a determination that the manually and explicitly-selected indirect termination condition is satisfied; and c. a reporting module including:

i. one or more reporting processors; and ii. a reporting non-transitory computer readable storage medium for instructions execution by the one or more reporting processors, the reporting non-transitory computer readable storage medium having stored instructions to report at least one security vulnerability determined to exist in the networked system according to results of the penetration testing campaign performed by the penetration-testing-campaign module, the instructions to report including at least one of (i) instructions to cause a display device to display a report describing the at least one security vulnerability, (ii) instructions to store the report describing the at least one security vulnerability in a file and (iii) instructions to electronically transmit the report describing the at least one security vulnerability.

* * * * *